US 8,826,132 B2

(12) United States Patent
Bull et al.

(10) Patent No.: US 8,826,132 B2
(45) Date of Patent: Sep. 2, 2014

(54) METHODS AND SYSTEMS FOR NAVIGATING CONTENT ON A PORTABLE DEVICE

(75) Inventors: William Bull, Mountain View, CA (US); Ben Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1186 days.

(21) Appl. No.: 12/145,230

(22) Filed: Jun. 24, 2008

(65) Prior Publication Data

US 2009/0063974 A1    Mar. 5, 2009

Related U.S. Application Data

(60) Provisional application No. 60/969,840, filed on Sep. 4, 2007.

(51) Int. Cl.
  *G06F 3/00* (2006.01)
  *G06F 3/16* (2006.01)

(52) U.S. Cl.
  USPC .......................................... 715/716; 715/727

(58) Field of Classification Search
  USPC ................................. 715/716, 854
  See application file for complete search history.

(56) References Cited

U.S. PATENT DOCUMENTS

| | | | | |
|---|---|---|---|---|
| 6,085,031 A | * | 7/2000 | Johnson et al. | 715/727 |
| 6,889,383 B1 | | 5/2005 | Jarman | |
| 7,028,325 B1 | * | 4/2006 | Rui et al. | 725/37 |
| 7,412,643 B1 | * | 8/2008 | Fischer et al. | 715/200 |
| 2002/0083096 A1 | * | 6/2002 | Hsu et al. | 707/513 |
| 2002/0163532 A1 | * | 11/2002 | Thomas et al. | 345/723 |
| 2004/0095396 A1 | * | 5/2004 | Stavely et al. | 345/838 |
| 2005/0022108 A1 | * | 1/2005 | Carro et al. | 715/500 |
| 2005/0111825 A1 | * | 5/2005 | Yun | 386/52 |
| 2005/0128361 A1 | * | 6/2005 | Li et al. | 348/701 |

(Continued)

FOREIGN PATENT DOCUMENTS

| | | |
|---|---|---|
| CN | 1695105 A | 11/2005 |
| WO | 02/097781 A1 | 12/2002 |
| WO | 03/060622 A2 | 7/2003 |

OTHER PUBLICATIONS

Keshavarz, Arezou, et al. "Sound Localization-Based Navigational User Interfaces," Multimedia, 2006. ISM'06. Eighth IEEE International Symposium On, IEEE, PI, 2006, pp. 728-733. XP031041856.

(Continued)

*Primary Examiner* — Stephen Alvesteffer
(74) *Attorney, Agent, or Firm* — Kilpatrick Townsend & Stockton LLP (57) ABSTRACT

Media players and associated methods are described that may allow a user to navigate content or other media assets. A media player or portable media device, can include features for generating and utilizing navigation information for navigating content, such as audio books. An audio book may be analyzed to determine one or more locations within the audio book that represent chapters, paragraphs, sentences, or the like. Navigation information may be generated indicative of the one or more locations that may be used by a media player or portable media device to play content in the audio book. The navigation information may include audio clips extracted from the audio book to represent the chapters and the like. In addition, a user may navigate content in response to predetermined user motions. A media player may scroll through content based on the predetermined user motions.

16 Claims, 9 Drawing Sheets

(56) References Cited

U.S. PATENT DOCUMENTS

| | | | |
|---|---|---|---|
| 2007/0133437 A1 | 6/2007 | Wengrovitz et al. | |
| 2008/0050096 A1* | 2/2008 | Ryu | 386/99 |
| 2008/0126937 A1* | 5/2008 | Pachet | 715/720 |
| 2009/0158155 A1* | 6/2009 | Quinn et al. | 715/716 |

OTHER PUBLICATIONS

Kobayashi, Minoru, et al. "Dynamic Soundscape: mapping time to space for audio browsing," Conference on Human Factors in Computing Systems, 1997. pp. 194-201. XP000697123.

Leavitt, Neal, "Let's Hear It for Audio Mining," Technology News Computer, IEEE Service Center, 2002, vol. 35, No. 10 pp. 23-25. XP031041856.

International Search Report of Dec. 3, 2008 for PCT Patent Application No. PCT/US2008/073747, 2 pages.

International Preliminary Report on Patentability of Mar. 9, 2010 for PCT with Written Opinion for PCT Patent Application No. PCT/US2008/073747, 6 pages.

Keshavarz, Arezou, et al., "Sound Localization-Based Navigational User Interfaces", Proceeding of the Eighth International Symposium on Multimedia (ISM' 06), Dec. 1, 2006, 6 pages.

Kobayashi, M., et al., "Dynamic Soundscape: Mapping Time to Space for Audio Browsing", Conference on Human Factors in Computing, New York, US, Mar. 22-27, 1997, pp. 194-201.

Leavitt, N., "Let's Hear it for Audio Mining", IEEE Service Center, Los Alamitos, CA, US, Oct. 1, 2002, vol. 35, No. 10, pp. 23-25.

First Office Action for Chinese Patent Application No. 200880105661.3 (Serial No. 2011121600140730) [PCT application in Chinese national phase], mailed Dec. 21, 2011, 9 pages.

Second Office Action for Chinese Patent Application No. 200880105661.3 (Serial No. 2011121600140730) [PCT application in Chinese national phase], mailed May 22, 2011, 16 pages.

Third Office Action for Chinese Patent Application No. 200880105661.3 (Serial No. 2011121600140730) [PCT application in Chinese national phase], mailed Aug. 2, 2012, 20 pages.

First Office Action for European Patent Application No. 08798292.2 [PCT application in Europe national phase], mailed Jun. 29, 2011, 5 pages.

Written Opinion for PCT Patent Application No. PCT/US2008/073747, Apr. 3, 2010, 5 pages.

Fourth Office Action for Chinese Patent Application No. 200880105661.3, mailed Jan. 5, 2013, 13 pages.

Rejection Decision for Chinese Patent Application No. 200880105661.3, mailed Jul. 1, 2013, 13 pages.

* cited by examiner

METHODS AND SYSTEMS FOR NAVIGATING CONTENT ON A PORTABLE DEVICE

CROSS-REFERENCES TO RELATED APPLICATIONS

This application claims priority to and the benefit of U.S. Provisional Application No. 60/969,840, filed Sep. 4, 2007 and entitled "Navigation Systems And Methods," the entire disclosure of which is herein incorporated by reference for all purposes.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

Traditionally, digital audio books could have been considered a niche application. Audio books may be increasingly used as storage capacities of media players or portable media device increase and become larger. Furthermore, improving compression methods, like MPEG-standards, can make it more convenient to store lengthy audio books result requiring less storage capacity. Moreover, the prevalence of the distribution of content or other media assets via the Internet hot spots, and other electronic retailers and broadband capabilities can make it easier to obtain content or other media assets, such as audio books.

Navigating lengthy content, such as an audio book, can be necessary, e.g., when the user wants to find a given position within the content. For example, the user may desire to find a particular point or location where he/she stopped listening to the last time. Additionally, an audio book may not be intended to be consumed in sequence, e.g., like a reference book. However, audio books may be stored sequentially, e.g., separated into tracks like digital music, rather than into chapters and pages of traditional paper media.

Accordingly, what is desired are improved methods and apparatus for solving some of the problems discussed above. Additionally, what is desired are improved methods and apparatus for reducing some of the drawbacks discussed above.

BRIEF SUMMARY OF THE INVENTION

The present invention relates generally to media players. More particularly, to techniques for navigating content and information using a media player.

In various embodiments, an electronic device, such as a media player or portable media device, can analyze content or other media assets to determine one or more locations within the content. The media player may automatically analyze the content for gaps, inflections, or other audio/visual aspects or patterns that may provide an indication where to segment the content for browsing and navigation. The media player may perform the analysis in real-time as the user interacts with the media player to navigate to various locations identified within the content. Content or other media assets may also be pre-processed by a content producer or a content management application to provide the media player with navigation information associated with or embedded within the content.

Using various analyses, navigation information can be generated based on content or other media assets that allows a user to browse within the content. The navigation information may allow a user to quickly access and discover locations within an audio book that more naturally represent the structure of content within the audio book. For example, audio book content can be analyzed to identify books, chapters, sections, paragraphs, sentences, or the like, within the audio book content. In various embodiments, clips can be generated with the navigation information to represent the chapters, sections, paragraphs, or sentences. The media player may output the clip to the user as a preview when the user interacts with the media player to find a particular location within the content.

In further embodiments, a media player or portable media device may allow the user to place cues, or bookmarks, into content or other media assets based on the navigation information. The user may then directly return to a specific location, or to mark a favorite clip or sample representing the content. The media player may generate an audible citation representing the content at one or more locations. The media player may extract audio clips and associate the clips with the audio book, a playlists, or the like.

In some embodiments, a media management device may gap analyze content or other media assets to determine where gaps (e.g., audio/visual gaps) in the content or other media assets occur. The media management device may generate navigation information representing the gaps. The navigation information may be uploaded to a media player or portable media device, stored as metadata, or inserted into the content to allow navigation of the content. The media management device may analyze content or other media assets according to parts of speech, such as inflection. Different parts of speech may provide navigation information that enables a user to browse or otherwise navigate the content.

In further embodiments, a user may interact with a media player or portable media device using a predetermined motion for navigating content. In response to input from a user, a media player may make a determination whether the input is indicative of a predetermined user motion. Some examples of a predetermined user motion may include a scrolling motion and a flicking motion. The media player may output content according to the predetermined user motion.

In one embodiment, a media player or portable media device may receive input a first input and a second input. The media player may initiate playback of content according to a predetermined user motion made in response to the first input until reception of the second input. The media player may output the content according in response to determining acceleration associated with user input. For example, the media player may initiate playback of the content at a first rate indicative of an acceleration of the user's motion. After a predetermined time or threshold, the media player may then subsequently output the content at a second different rate.

A further understanding of the nature and the advantages of the inventions disclosed herein may be realized by reference of the remaining portions of the specification and the attached drawings.

BRIEF DESCRIPTION OF THE DRAWINGS

In order to better describe and illustrate embodiments and/or examples of those inventions disclosed herein, reference may be made to one or more accompanying drawings. The additional details or examples used to describe the accompanying drawings should not be considered as limitations to the scope of any of the disclosed inventions, the presently described embodiments and/or examples, and the presently understood best mode of these inventions.

DETAILED DESCRIPTION OF THE INVENTION

In various embodiments, a user can interact with a media player or portable media device to browse or otherwise initiate playback of content or other media assets. The media player or portable media device may analyze content or other media assets to determine navigation information. The navigation information can enable a user to more readily access portions of linear content. The media player may also be responsive to user interactions for navigating content. The media player may output content for playback to the user using one or more techniques representing user motions.

Figure 1:
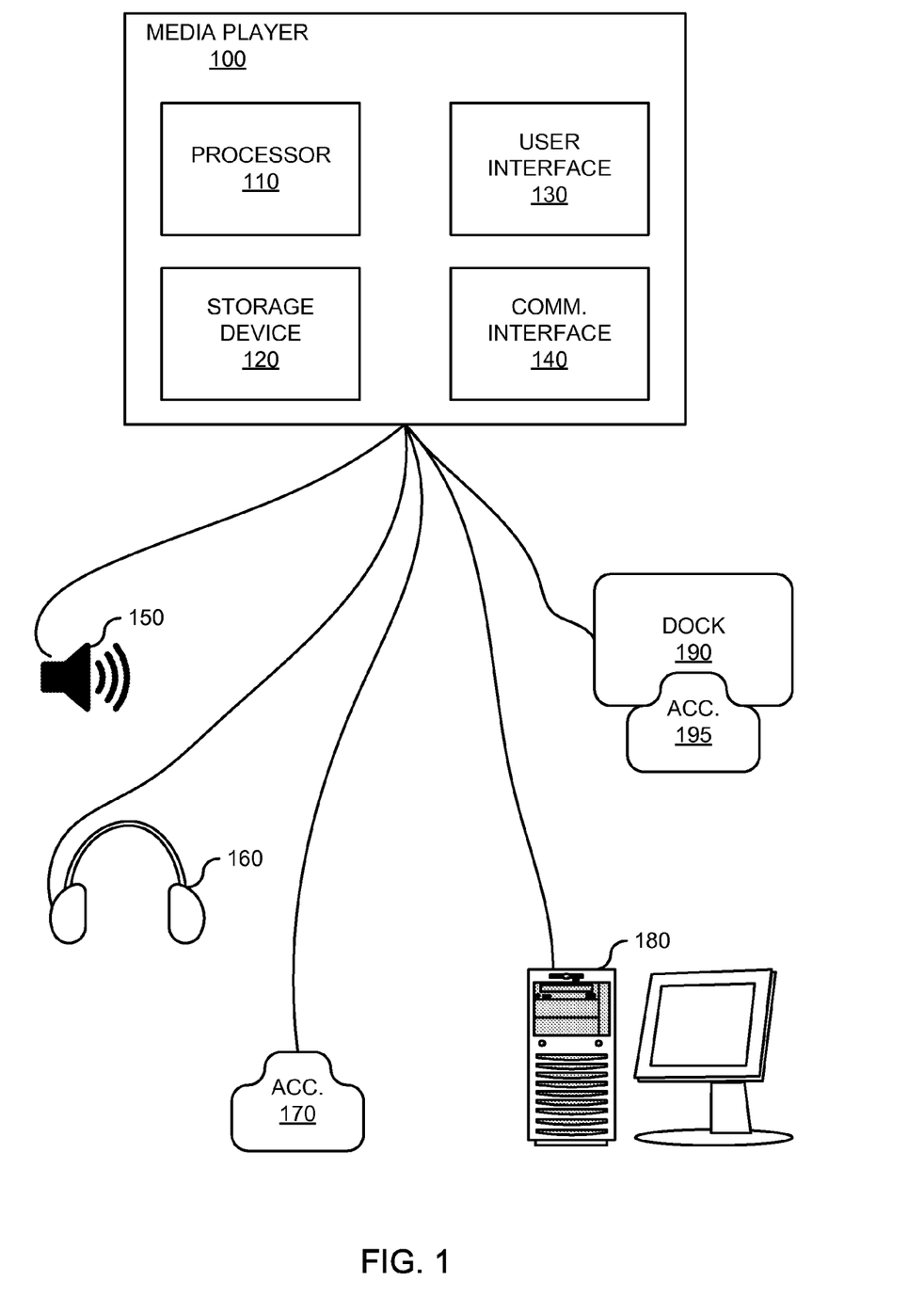
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 can be the iPod® media player, which is available from Apple, Inc. of Cupertino, Calif. Another example of media player 100 can be a personal computer, such as a laptop or desktop.

In this example, media player 100 includes processor 110, storage device 120, user interface 130, and communications interface 140. Processor 110 can control various functionalities associated with media player 100. Media player 100 may output audio content, video content, image content, and the like. Media player 100 may also output metadata or other information associated with content, such as track information and album art.

Typically, a user may load or store content onto media player 100 using storage device 120. Storage device 120 can include read-only memory (ROM), random access memory (RAM), non-volatile memory, flash memory, floppy disk, hard disk, or the like. A user may interact with user interface 130 of media player 100 to view or consume content. Some examples of user interface 130 can include buttons, click wheels, touch pads, displays, touch screens, and other input/output devices.

Media player 100 can include one or more connectors or ports that can be used to load content, retrieve content, interact with applications running on media player 100, interface with external devices, and the like. In this example, media player 100 includes communications interface 140. Some examples of communications interface 140 can include universal serial bus (USB) interfaces, IEEE 1394 (or FireWire/iLink®) interfaces, universal asynchronous receiver/transmitters (UARTs), wired and wireless network interfaces, transceivers, and the like. Media player 100 may connect to devices, accessories, private and public communications networks (e.g., the Internet), or the like, using communications interface 140.

In one example, media player 100 can be coupled via a wired and/or wireless connector or port to output audio and/or other information to speakers 150. In another example, media player 100 may be coupled via a wired and/or wireless connector or port to output audio and/or other information to headphones 160. In yet another example, media player 100 may be coupled via a wired and/or wireless connector or port to interface with an accessory 170 or a host computer 180. The same connector or port may enable different connections at different times.

Media player 100 can be physically inserted into docking system 190. Media player 100 may be coupled via a wired and/or wireless connector or port to interface with docking system 190. Docking system 190 may also enable one or more accessory devices 195 to couple with wires or wirelessly to interface with media player 100. Many different types and functionalities of accessory devices 170 and 195 can interconnect to or with media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

In various embodiments, media player 100 can receive content or other media assets from a computer system (e.g., host computer 160). The computer system may serve to enable a user to manage media assets stored on the computer system and/or stored on media player 100. As an example, communications interface 140 may allow media player 100 to interface with host computer 160. Host computer 160 may execute a media management application to manage media assets, such as loading songs, movies, photos, or the like, onto media player 100. The media management application may also create playlists, record or rip content, schedule content for playback or recording, or the like. One example of a media management application can be iTunes®, produced by Apple, Inc. of Cupertino, Calif.

In various embodiments, media player 100 can provide enhanced navigation features for interacting with media assets and content, such as audio books. For example, media player 100 may store navigation information associated with content, such as an audio book, indicative of one or more location of portions of the content. Accordingly, chapters, titles, sections, paragraphs, sentences, and the like, may be represented by navigation information, such as a clip extracted from the chapter, paragraph, etc. within an audio book. Media player 100 may retrieve the navigation information from the content or from metadata associated with the content to be outputted (e.g., played back or displayed) to the user to navigate the content.

In some embodiments, media player 100 may allow a user to insert cues into content, such as an audio book, at one or various locations to resume playback at a particular location, to mark a favorite phrase/sentence/paragraph as an audio clip, to repeat a particular section of content, and the like. In some embodiments, media player 100 may identify and extract portions of content, as a representative clip or excerpt of an audio book, chapter, or sequence to create an "audio quotable citation."

In various embodiments, media player 100 may receive content that has been prepared with navigation information indicative of the location of chapters, sections, paragraphs, sentences, and the like, to be outputted, displayed, or otherwise used by media player 100 to jump to specific locations. Media player 100 may further analyze content, such as an audio book, to determine the beginning and/or ending of a chapter, section, paragraph, and sentence, and marks the location for access by a user.

Accordingly, media player 100 may extend the use of content stored in large sequential files, such as audio books. Additionally, content prepare according to one or more of the disclosed navigation techniques may further be enjoyed on media players that may not have a display or visual interface for the user.

In various embodiments, a user may re-master an audio book or other content manually or automatically placing bookmarks, cues, or other markers at various desired locations within the audio book. In one embodiment, an analysis of an audio book or other content may be performed to generate a relevant "quote." The quote may be the user's favorite passage from an audio book, or a collection of sentences representing a book or one or more chapters in the book. One or more clips, audio quotes, or audio quotable citations may be collected into a playlist for playback or display using media player 100.

Figure 2:
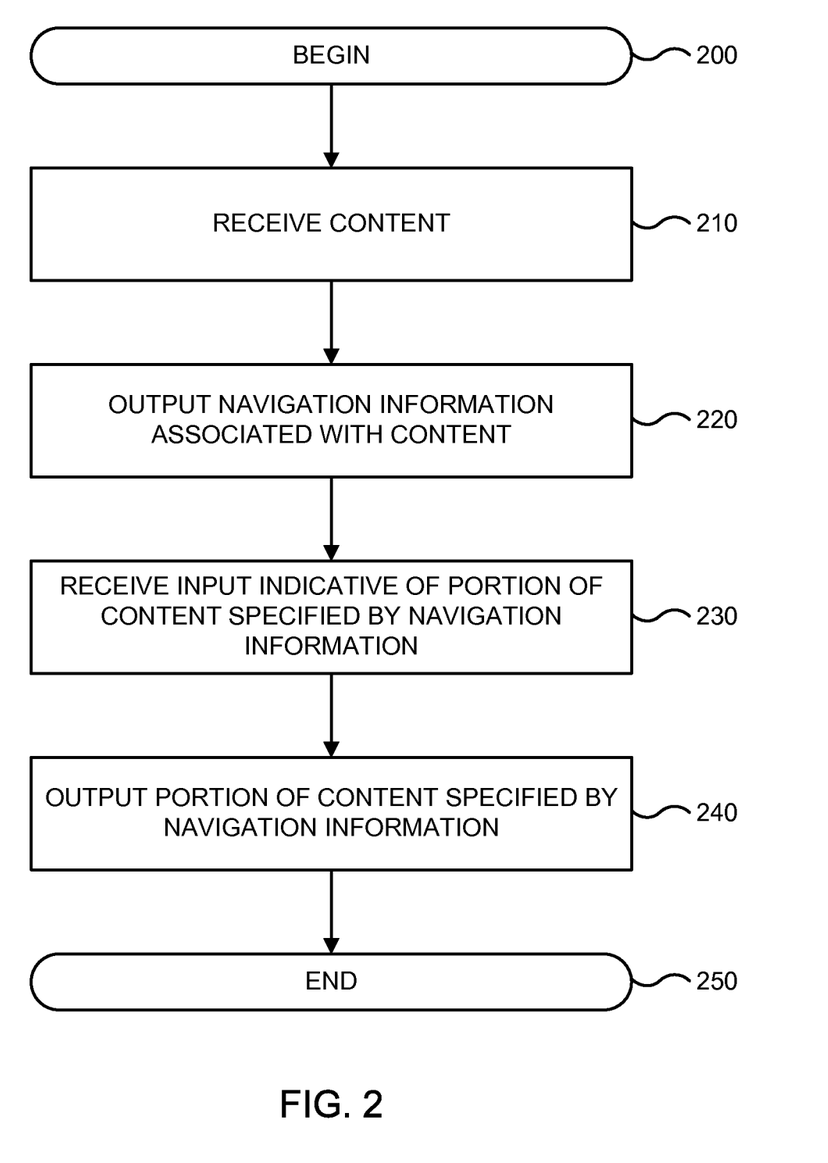
FIG. 2 is a simplified flowchart of a method for content navigation in one embodiment according to the present invention.

FIG. 2 is a simplified flowchart of a method for content navigation in one embodiment according to the present invention. The processing depicted in FIG. 2 may be performed by software modules (e.g., instructions or code) executed by a processor of a computer system, by hardware modules of an electronic device, or combinations thereof. FIG. 2 begins in step 200.

In step 210, content is received. For example, media player 100 may retrieve content from a storage device, via a communications interface, or the like. Content may be stored on media player 100 using a disk drive or flash drive and/or streamed to media player 100 over a wired/wireless network connection. Some examples of content are songs, movies, photos, images, audio books, e-books, and the like. In one example, media player 100 may receive a user selection indicating content or a portion of content.

In step 220, navigation information associated with the content is output. Navigation information can include any information associated with a location of content or a portion of the content. Some examples of navigation information are time codes, pointers, a mapping or lookup table, audio and/or visual representations of a location of content, and other information associated therewith.

In one example, if media player 100 registers a counter at the beginning of an audio book, media player 100 may output navigation information by audibly conveying chapter titles, chapter summaries, tables of contents, and the like to the user. In another example, media player 100 displays a predetermined number of frames or seconds of one or more video clips representing a movie sequence. In a further example, if media player 100 registers a location within a portion of content, media player 100 may output navigation information for only that portion of content. Media player 100, for example, may audibly convey the first sentence of each paragraph of a particular chapter of an audio book.

In step 230, input is received indicative of a portion of content specified by the navigation information. For example, media player 100 may read aloud or otherwise output navigation information in the form of a chapter summery associated with a chapter of an audio book. A user associated with media player 100 may press a SELECT or PLAY button indicating that the user wishes to hear the particular chapter represented by the audio chapter summery navigation information. Additionally, the user may further press a FORWARD or RIGHT button to move between paragraphs of the selected chapter representing the navigation information after listening to the first sentence of each paragraph.

In step 240, the portion of the content specified by the navigation information is output. Continuing the previous example, media player 100 may seek to or further retrieve content representing the selected chapter or paragraph and playback the selected chapter or paragraph of the audio book. FIG. 2 ends in step 250.

Accordingly, media player 100 may allow the user to select a particular location within large, sequential content, such as audio books. Moreover, in various embodiments, navigation information may be audibly conveyed to a user to assist in navigation where the user's media player lacks a display or other visual output to the user. Thus, a user is able to choose a location, such as a particular chapter, section, paragraph, or sentence within the audio book based on the navigation information and navigate directly to that particular choice.

Figure 3:
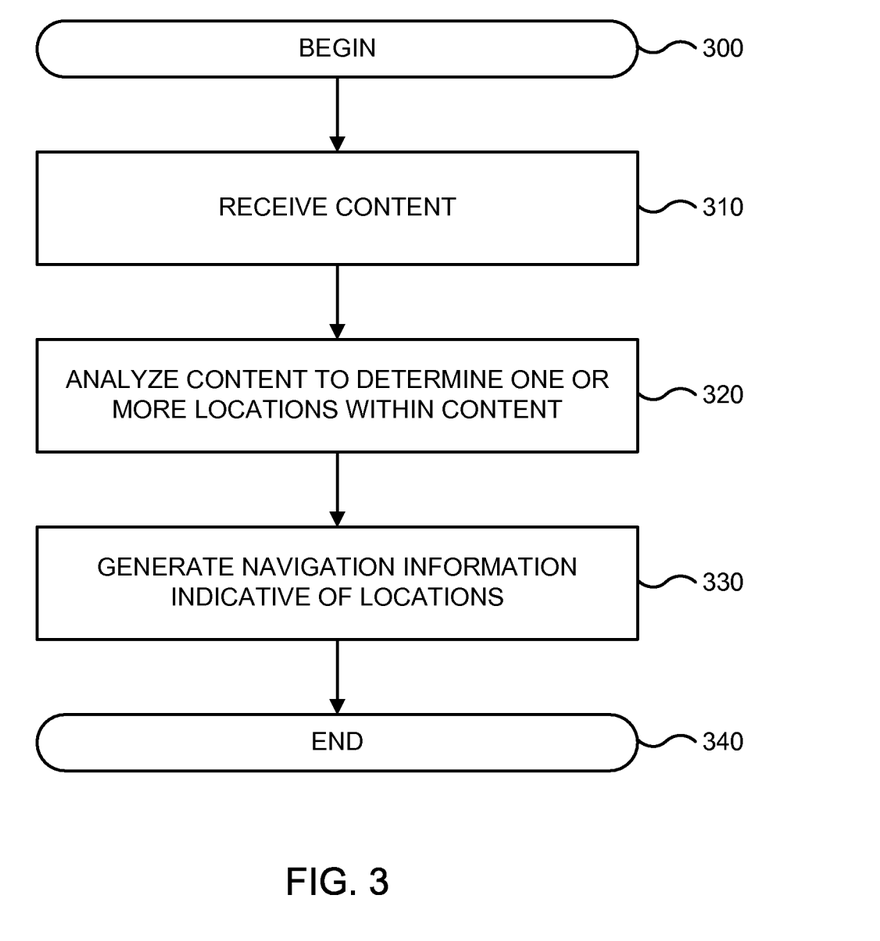
FIG. 3 is a flowchart of a method for generating navigation information in one embodiment according to the present invention.

FIG. 3 is a flowchart of a method for generating navigation information in one embodiment according to the present invention. FIG. 3 begins in step 300.

In step 310, content is received. For example, content, such as an audio book, motion picture sequence, or movie, may be received by media player 100 or by host computer 160 or by another computer system (not shown).

In step 320, the content is analyzed to determine one or more locations within the content. In one example, one or more audio books are received in digital format from a publisher. A distributor may use one or more computer systems to perform analysis on the one or more audio books to determine locations within the audio books for creating navigation information. For example, the one or more audio books may be analyzed using gap analysis that identifies "gaps" in the audio book. A gap may include an absence of audio information, any portion of silence, or other audio information below a predetermined limit or threshold. In another example, the one or more audio books may be analyzed using linguistic or inflection analysis that identifies locations within the audio books based on structural and grammatical data. The distributor may then make the audio books available to consumers along with the navigation information.

In another example, a user downloads an audio book from a distributor or website to a computer system, for example, host computer 160. Analysis of the audio book then may be initiated automatically by host computer 160, or at the initiative of the user. Again, host computer 160 may use gap analysis or other linguistic, morphological, or inflection analyses to identify the locations within the audio book file. The user may load the content with the navigation information onto a portable or handheld device, such as an MP3 player, cell phone, or the like.

In some embodiments, media player 100 may analyze the audio book file or other content in an off-line model. Alternatively, content may be analyzed for navigation information in real-time or near real-time to determine a location within the audio book specified by the user. Gap analysis or other linguistic, morphological, or inflection analyses may be used individually or in combination to identify the locations within content or other media assets association with navigation information.

In step 330, navigation information indicative of the locations in the content is generated. For example, pointers, markers, bookmarks, and the like, may be generated and/or inserted into content. Chapter markers may be inserted in to an audio book file to be stored along with audio book content. In some embodiments, portions of the content associated with the locations may be extracted. The portions of extracted content may be associated with the pointers, markers, cues, and bookmarks. Thus, when a user uses the navigation information to select a location, the user may experience the extracted content associated with the location, such as a song sample, a pre-recorded chapter summary, the first sentence of a paragraph, a video clip, faces within photos, or the like.

In another example, metadata may be created and stored alongside the audio book file that indicates the locations of chapters, sections, paragraphs, sentences, and the like. In further examples, the audio book may be broken into smaller multiple files each with their own separate navigation information. FIG. 3 ends in step 340.

In various embodiments, portions of content may be extracted using gap or inflection analysis to create clips or summaries of content. For example, one or more portions of content representing sentences of an audio book may be extracted and compiled to provide a chapter summary or "dust jacket" introduction to an audio book. In another example, the user may indicate a portion of an audio book that represents the user's favorite quote. The favorite quote may be extracted and stored. The favorite quote then may be played whenever the user highlights the audio book.

Figure 4:
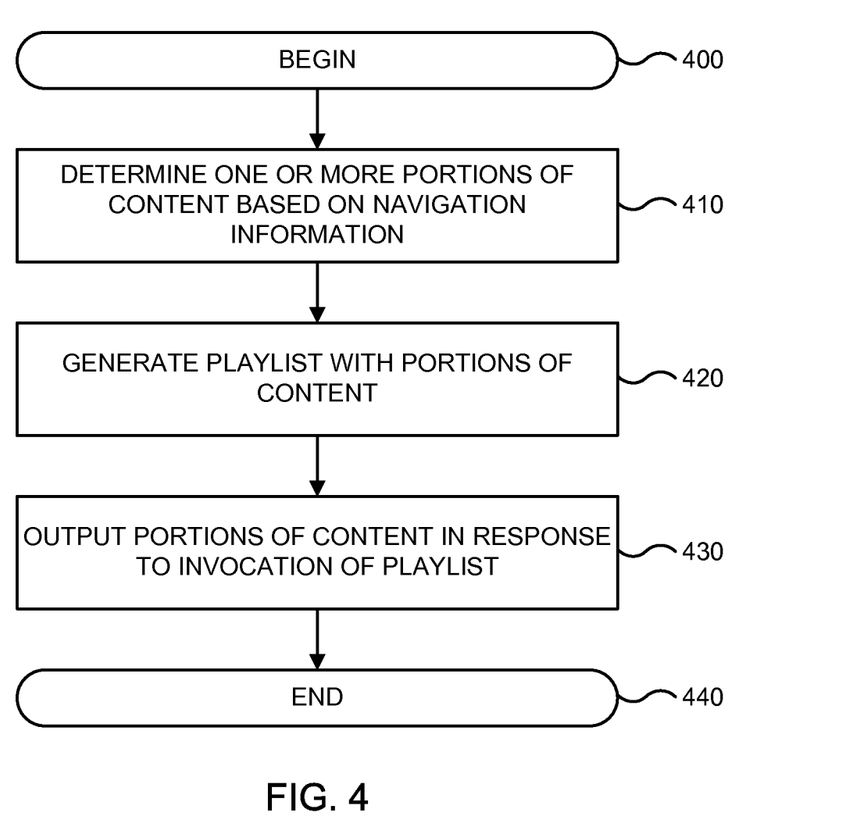
FIG. 4 is a flowchart of a method for using navigation information with a playlist in one embodiment according to the present invention.

FIG. 4 is a flowchart of a method for using navigation information with a playlist in one embodiment according to the present invention. FIG. 4 begins in step 400.

In step 410, one or more portions of content are determined based on navigation information. For example, navigation information may include information representing locations and content for each location. Chapter summary content may represent one of a plurality of chapters associated with an audio book at the locations. In another example, one or more motion sequence clips are determined and extracted from a movie. Each of the one or more motion sequence clips are extracted from portions of the movie representing the "best parts" of the movie.

In step 420, a playlist is generated with the one or more portions of the content. A playlist may include each or the portions of content, or information indicative of each of the portions of the content. In one example, each of the portions of the content are merged sequentially into a single file. In another example, identifiers associated with each of the portions are stored in a predetermined sequence.

In step 430, the one or more portions are outputted in response to invocation of the playlist. For example, a user may select the playlist using media player 100. Upon pressing PLAY, for example, the one or more portions are outputted (e.g., audibly played or displayed) the user. When the user remains on a portion of the content in the playlist, the location in the original content may be identified and playback of the original content may commence seamlessly with playback of the selected content in the playlist. FIG. 4 ends in step 400.

According to various embodiments, media player 100 allows a user to navigate quickly through content, such as audio books. Navigation information, such as chapter/paragraph indicators and/or excerpts of a particular chapter/paragraph, may be output to a user associated with media player 100 allowing the user to navigate, without the user having to look at the display, or especially if there is no display or other visual interface.

In various embodiments, a user may interact with a media player or portable media device to quickly scroll through information associated with content and/or content itself by using one or more predetermined user motions. Typically, a media player may scroll or seek through content at a predetermined rate or at a rate. The predetermined rate my be constant and directly specified by input received by the user. However, these traditional methods of scrolling may become tedious, for example, as the size of a user's content library increases the constant scroll rate may appear that procuring music can take forever to the user. Furthermore, these traditional scroll methods may scroll only at the constant rate and/or be limited to direct interaction of the user.

In one example, a user may perform a "flicking motion" with a media player or portable media device. For example, a user may "flick" a portion of user interface 120 of media player 100. Media player 100 may interpret the "flicking motion" or "flick" as a request to automatically scroll through content and/or information associated with the content. The scroll may be performed according to a predetermined function. Thus, media player 100 may detect the "flick," and automatically scroll through content, such as a song or plurality of song clips, or information associated with the content based on the detected "flick." Other attributes of input, gestures, button presses, and the like, may be interpreted to represent a predetermined motion causing media player 100 to automatically scroll through the content or the information associated with the content.

In some embodiments, a predetermined function associated with a recognize gesture may define the initial rate or rates at which media player 100 scrolls through information, and the rate or rates at which media player 100 subsequently decreases the scroll rate until automatically stopping. The "flick" may appear to the user as if the user has spun toy top or a quarter, which has a rapid initial angular momentum and which subsequently decreases in momentum due to friction until stopping. Thus, media player 100 may initially scroll through songs in a playlist rapidly in response to a flick to thereafter reduce the speed of the scroll to allow the user to either choose a song or send media player 100 another flick to keep scrolling.

Figure 5:
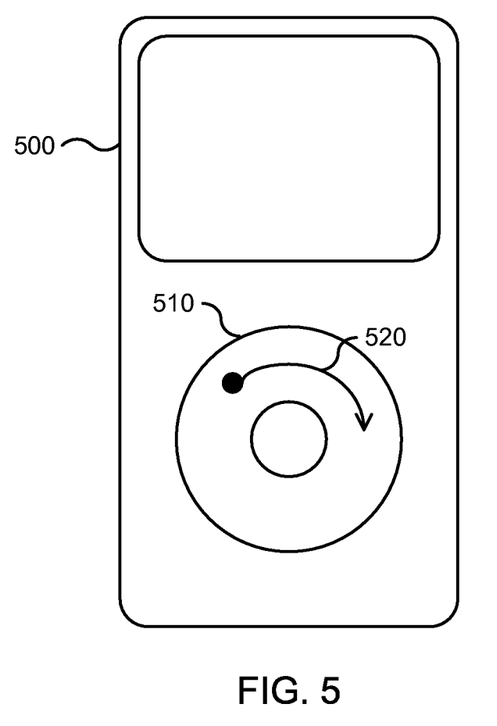
FIG. 5 is a block diagram of a user motion with a media player for use with content scrolling in one embodiment according to the present invention.

FIG. 5 is a block diagram of a user motion with media player 500 for use with content scrolling in one embodiment according to the present invention. Referring to FIG. 5, media player 500 includes a user interface wheel 510. A user may interact with user interface wheel 510 to interact with content stored on media player 500, and to perform one or more predetermined motions. In one embodiment, a predetermined motion can cause media player 500 to automatically scroll content. In another embodiment, a predetermined motion may cause media player 500 to quickly scroll through content as if a dial or knob has been quickly spun, or an object had been "flicked." In order to create a "flick," a user may press user interface wheel 510 and quickly release after indicating a desired direction (shown by arrow 520) along the rotational axis of user interface wheel 510.

Alternatively, media player 500 may include a user interface strip or other user interface mechanisms to interact with media player 500 to create predetermined motions.

Figure 6:
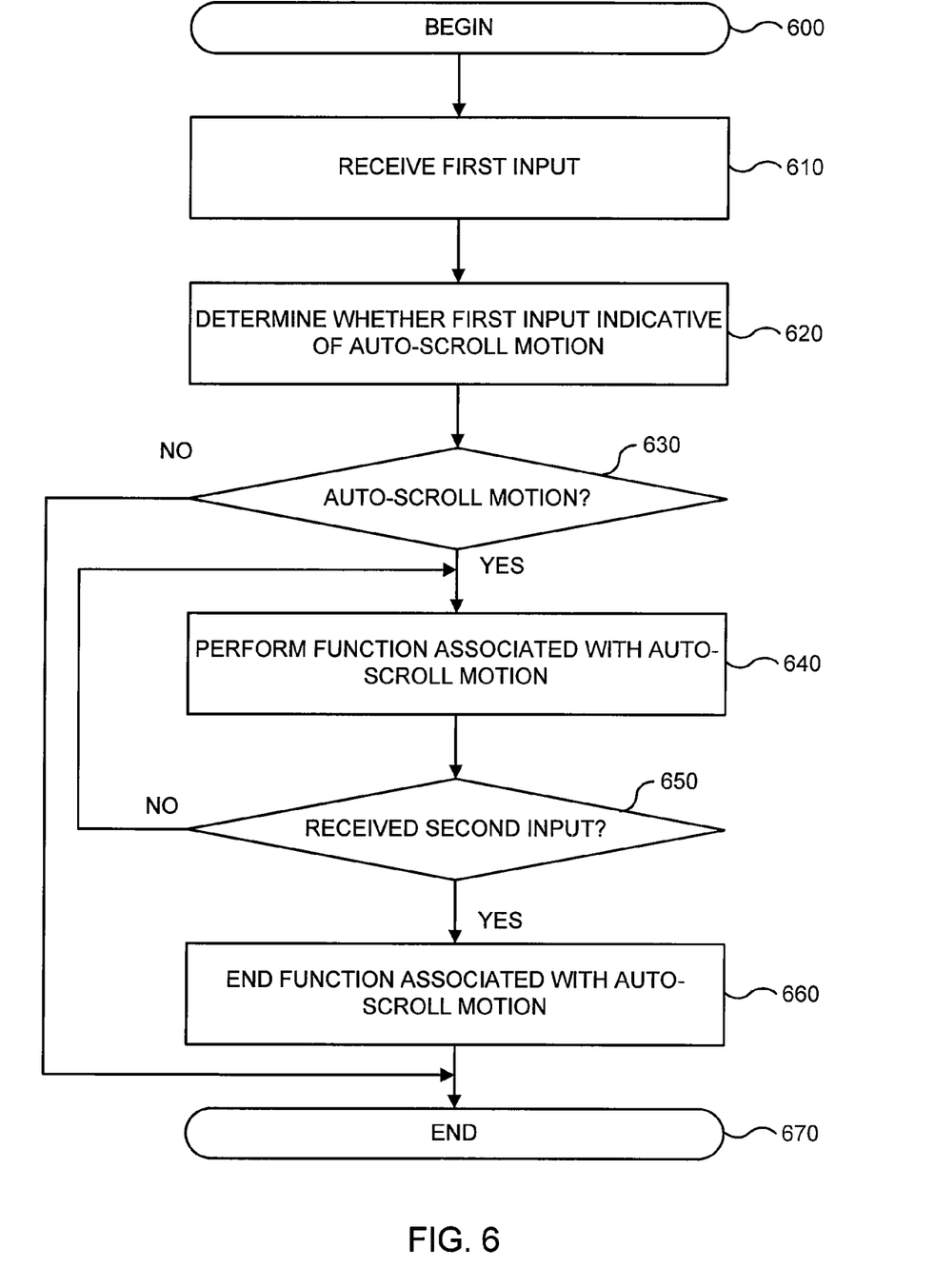
FIG. 6 is a flowchart of a method for auto-scrolling content in one embodiment according to the present invention.

FIG. 6 is a flowchart of a method for auto-scrolling content in one embodiment according to the present invention. The processing depicted in FIG. 6 may be performed by software modules (e.g., instructions or code) executed by a processor of media player 500, by hardware modules, or combinations thereof. FIG. 6 begins in step 600.

In step 610, a first input is received. For example, the first input may register a press with user interface 510. In another example, the first input may include a press and rotational motion with user interface 510. In step 620, a determination is made whether the first input is indicative of an auto-scroll motion. For example, media player 500 may determine that the user has pressed user interface 510 and completed one or more angular revolutions without depressing from user interface 510.

In step 630, if an auto scroll motion is determined, a function associated with the auto scroll motion is performed in step 640. For example, media player 500 may continuously scroll at a predetermined scroll rate through content without further interaction from the user. In step 650, a determination is made whether a second input is received. One example of the second input may be the user depressing from user interface 510, for example, by lifting a finger from user interface 510.

In step 660, if a second input is received, the function associated with the auto scroll motion is ended. For example, when the user lifts a finger from user interface 510, media player 500 terminates automatically scrolling through the content at the predetermined rate. FIG. 6 ends in step 670.

Figure 7:
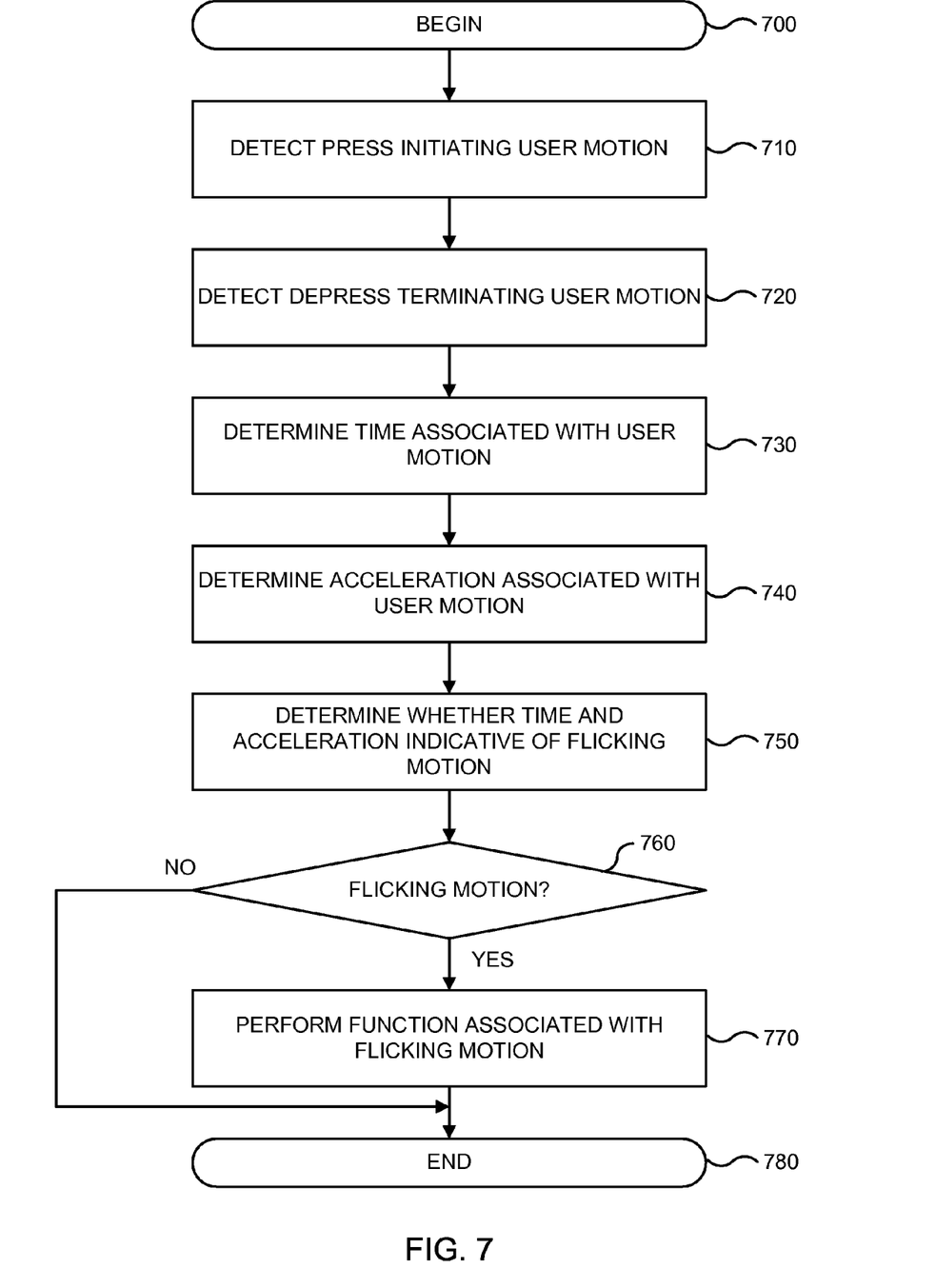
FIG. 7 is a flowchart of a method for scrolling content in response to a "flick" in one embodiment according to the present invention.

FIG. 7 is a flowchart of a method for scrolling content in response to a "flick" in one embodiment according to the present invention. FIG. 7 begins in step 700.

In step 710, a press is detected initiating a user motion. For example, media player 500 may detect when a user's finger encounters user interface wheel 510. In step 720, a depress is detected terminating the user motion. Continuing the previous example, media player 500 may detect when the user's finger releases from its encounter with user interface wheel 510. In some embodiments, media player 500 may register other information along with the press, such as pressure, temperature, biometric information, multi-touch, and the like.

In step 730, the time associated with the user's motion is determined. For example, media player 500 may start a counter upon detecting the press and terminate the counter upon detecting the depress. In another example, media player 500 may compare timestamps associated with the press and the depress to determine the time associated with the user's motion.

In step 740, acceleration associated with the user's motion is determined. For example, if the time associated with the user's motion is below a predetermined limit or threshold, media player 500 may associated a value for the acceleration proportional to the predetermined limit or threshold. In various embodiments, media player 500 may translate linear or angular momentum of the user's motion representing a "flick" into the acceleration.

In step 750, a determination is made whether the timing acceleration are indicative of a "flicking" motion. In step 760, if the user motion is indicative of a "flicking" motion, a function associated with the "flicking" motion is performed. For example, media player 500 may rapidly scroll through information for an initial predetermined time interval, and subsequently reduce the scroll rate over a second subsequent predetermined time interval gradually decaying the scroll rate to zero.

Thus, in various embodiments, media player 500 can scroll through content (or information associated with content) in response to the information representing the user motion. Thus, media player 500 may allow a user to "flick" a user interface to automatically scroll through information. The initial fast scroll rate can be followed by a subsequent decay in the scroll rate to provide an opportunity for the user to quickly seek through large content libraries or files. Accordingly, media player 500 may detect motions or other input provided by a user and scroll through information associated with content and/or the content itself in response to the motions provided by the user. FIG. 7 and in step 780.

Figure 8:
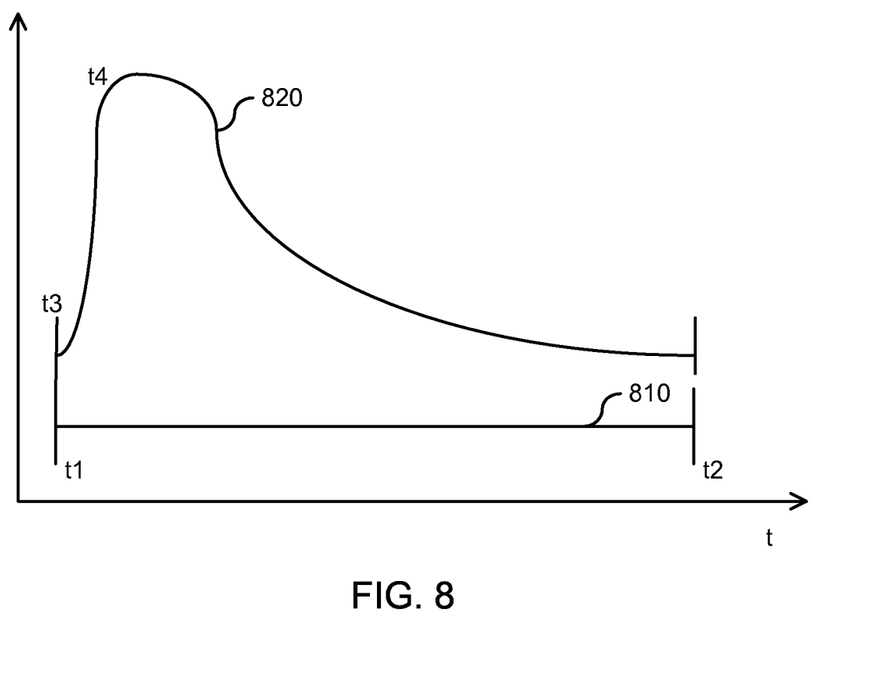
FIG. 8 is a graph illustrating different scroll rates for user motions in one embodiment according to the present invention.

FIG. 8 is a graph illustrating different scroll rates for user motions in one embodiment according to the present invention. Referring the FIG. 8, a user motion 810 may start at time t1 and end at time t2. In this example, the user can apply a constant "pressure" (such as a steady angular momentum around user interface wheel 520) during the interval between time t1 and time t2. The user may not depress from user interface 510 at time t2. Media player 500 may interprets this type of user motion as a predetermined motion, and automatically scrolls through content at a predetermined scroll rate until the user depresses from user interface 520, or provides another user input.

In another example, a second user motion 820 may start at time t3 and ends at time t4. If the "pressure" or acceleration detected during user motion 820 is greater than a predetermined limit or threshold, and second user motion 820 may be identified as a "flick" motion. Additionally, the duration of user motion 820 may be substantially shorter than user motion 810 further allowing media player 500 to classify user motion 820 as a "flick" motion.

In some embodiments, the scroll rate associated with user motion 810 over time interval t1 to t2 may remain constant. In contrast, the scroll rate associated with user motion 820 may be defined by a predetermined function responsive to the acceleration and/or time associated with the "flick" motion. In this example, the scroll rate associated with user motion 820 can rise very quickly reaching a peak, and then decay (e.g., linearly or exponentially) until reaching a predetermined value, such as zero, or enabling another function associated with media player 500.

Figure 9:
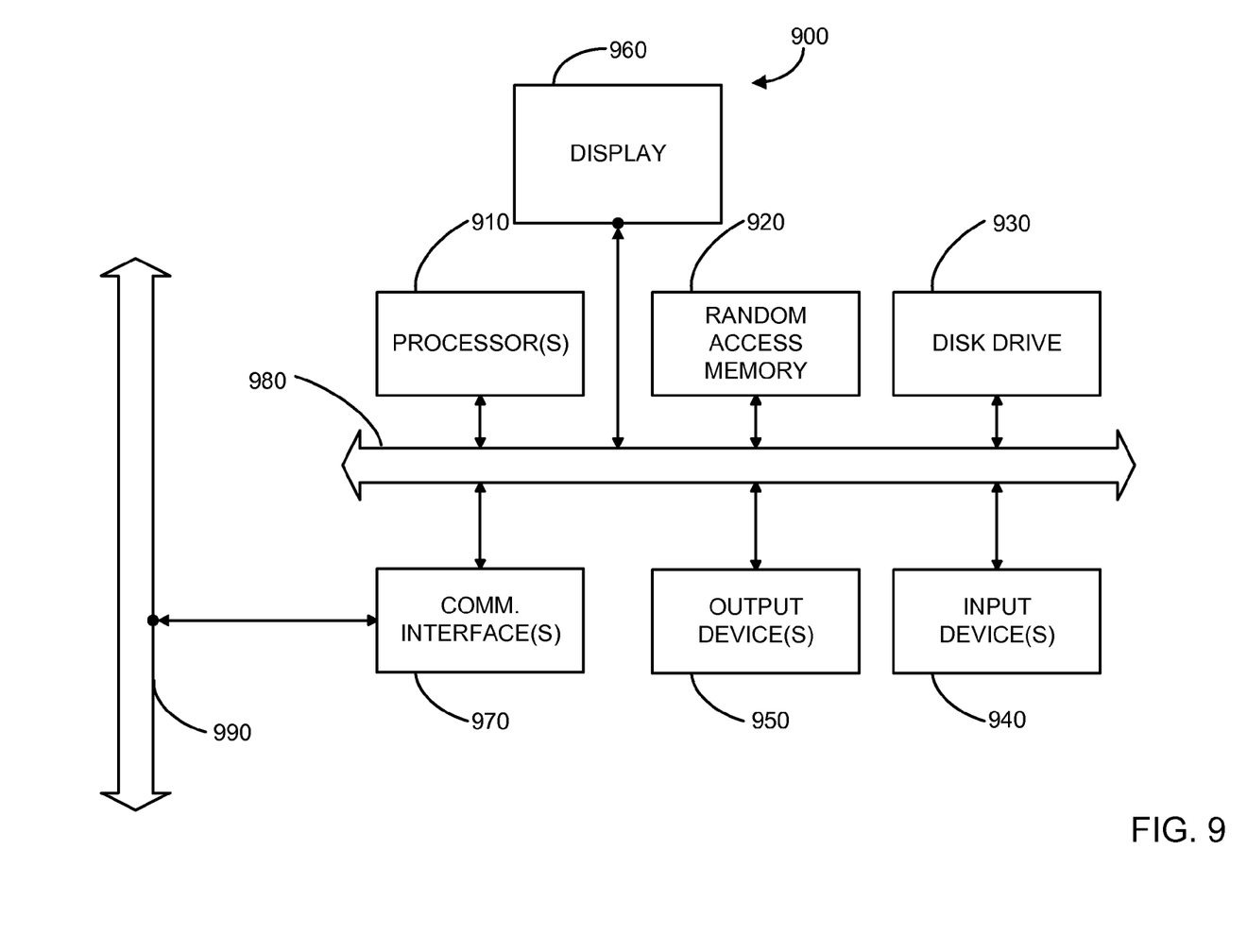
FIG. 9 is a simplified block diagram of a computer system that may incorporate embodiments of the present invention.

FIG. 9 is a simplified block diagram of a computer system 900 that may incorporate embodiments of the present invention. FIG. 9 is merely illustrative of an embodiment incorporating the present invention and does not limit the scope of the invention as recited in the claims. One of ordinary skill in the art would recognize other variations, modifications, and alternatives.

In one embodiment, computer system 900 includes processor(s) 910, random access memory (RAM) 920, disk drive 930, input device(s) 940, output device(s) 950, display 960, communications interface(s) 970, and a system bus 980 interconnecting the above components. Other components, such as file systems, storage disks, read only memory (ROM), cache memory, codecs, and the like may be present.

RAM 920 and disk drive 930 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 940 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 940 may allow a user to select objects, icons, text, and the like, via a command such as a click of a button or the like. In various embodiments, output device 950 is typically embodied as a display, a printer, a force-feedback mechanism, an audio output, a video component output, and the like. Display 960 may include a CRT display, an LCD display, a Plasma display, and the like.

Embodiments of communications interface 970 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 990, to a FireWire bus, or the like. In other embodiments, these computer interfaces may be physically integrated on the motherboard or system board of computer system 900, and may be a software program, or the like.

In various embodiments, computer system 900 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 900 may also include an operating system, such as Microsoft Windows®, Linux®, Mac OS X®, real-time operating systems (RTOSs), open source and proprietary OSs, and the like.

FIG. 9 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smartphone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
receiving, by one or more processors, content, wherein receiving content includes receiving an audio book;
analyzing the content to determine a plurality of locations within the content;
generating navigation information for the content, the navigation information including information indicative of the plurality of locations within the content;
extracting a portion of the content for each of the plurality of locations, the extracted portion of the content for each location being representative of content at that location;
generating a playlist for the content using the navigation information, the playlist including a plurality of items corresponding to the plurality of locations;
receiving a selection directed at a particular item from the plurality of items in the playlist, the particular item corresponding to a particular location in the plurality of locations; and
providing a particular extracted portion of the content corresponding to the particular location.

2. The method of claim 1 wherein analyzing the content comprises identifying one or more gaps in audio or video data associated with the content to determine the plurality of locations.

3. The method of claim 1 wherein analyzing the content comprises performing an inflection analysis to determine parts of speech within the content, one or more parts of speech representing a location in the plurality of locations.

4. The method of claim 1 wherein generating navigation information indicative of the plurality of locations within the content comprises generating chapter information for plurality of locations associated with the audio book.

5. The method of claim 1 wherein generating navigation information indicative of the plurality of locations within the content comprises generating audio clips representing portions of the audio book at the plurality of locations.

6. The method of claim 1 wherein generating navigation information indicative of the plurality of locations within the content comprises generating an audible citation representing the content at the plurality of locations.

7. The method of claim 1, wherein analyzing the content to determine the plurality of locations includes identifying one or more gaps, inflections, or other audio/visual patterns that provide an indication where to segment the content.

8. The method of claim 1, wherein analyzing the content to determine the plurality of locations within the content includes determining a plurality of content segments, the plurality content segments being identified using the plurality of locations, wherein the extracted portion of the content for each of the plurality of locations is extracted from a corresponding content segment from the plurality of content segments.

9. The method of claim 1, further comprising:
in response to receiving another selection directed at the particular extracted portion of the content, providing a corresponding portion of the content represented by the particular extracted portion of the content.

10. A method for navigating content using a handheld device, the method comprising:
receiving, by the handheld device, selection of audio book data from a user interacting with the handheld device including navigation information for the audio book data, wherein the navigation information is indicative of a book structure within the audio book data;

determining, by the handheld device, one or more portions of the audio book data for one or more locations within the audio book data based on the navigation information;

extracting the one or more portions of the audio book data, the one or more portions of the audio book data being representative of content at the one or more locations;

generating, by the handheld device, a playlist using the one or more portions, the playlist including one or more items corresponding to the one or more locations;

receiving a selection directed at a particular item from the one or more items in the playlist, the particular item corresponding to a particular location in the one or more locations; and outputting a particular extracted portion of the audio book data corresponding to the particular location.

11. The method of claim 10 wherein outputting the content comprises outputting one or more audio clips.

12. The method of claim 10, further comprising:

segmenting the audio book data into one or more sub-contents, wherein each of the one or more portions of the audio book data is determined and extracted from each of the one or more sub-contents of the audio book data.

13. A media player comprising:
a storage medium configured to store one or more audio books; and
a processor configured to:
receive input identifying an audio book from the one or more audio books;
determine navigation information associated with the audio book, the navigation information specifying one or more locations within the audio book;
extract a portion of the audio book for each of the one or more locations within the audio book, the extracted portion of the audio book for each location being representative of content at that location;
generate a playlist for the audio book using the navigation information, the playlist including one or more items corresponding to the one or more locations;
receive a selection directed at a particular item from the one or more items in the playlist, the particular item corresponding to a particular location in the one or more locations; and
provide a particular extracted portion of the audio book corresponding to the particular location.

14. A system comprising:
means for receiving audio book data, the audio book data including navigation information for navigating the audio book data, wherein the navigation information includes one or more locations and wherein each location from the one or more locations is associated with a portion of the audio book data;
means for extracting one or more portions of the audio book data, the one or more portions of the audio book data being representative of content at the one or more locations;
means for generating a playlist using the one or more portions, the playlist including one or more items corresponding to the one or more locations;
means for receiving a selection directed at a particular item from the one or more items in the playlist, the particular item corresponding to a particular location in the one or more locations; and
means for outputting a particular extracted portion of the audio book data corresponding to the particular location.

15. A method comprising:
receiving, by a portable device, content including navigation information associated with the content, the navigation information including information indicative of a plurality of locations within the content, wherein receiving content includes receiving an audio book;
determining, by the portable device, one or more portions of the content based on the navigation information;
extracting a portion of the content for each of the plurality of locations, the extracted portion of the content for each location being representative of content at that location;
generating, by the portable device, a playlist for the content using the navigation information, the playlist including a plurality of items corresponding to the plurality of locations;
receiving a selection directed at a particular item from the plurality of items in the playlist, the particular item corresponding to a particular location in the plurality of locations; and
playing a particular extracted portion of the content corresponding to the particular location.

16. A non-transitory computer-readable storage medium encoded with a set of program instructions that, when executed, causes one or more processors in a computing device to execute a method, the method comprising:
instructions that cause the processor to receive audio book data;
instructions that cause the processor to determine navigation information associated with the audio book, the navigation information specifying one or more locations within the audio book;
instructions that cause the processor to extract a portion of the audio book data for each of the one or more locations within the audio book, the extracted portion of the audio book data for each location being representative of content at that location;
instructions that cause the processor to generate a playlist for the audio book using the navigation information, the playlist including one or more items corresponding to the one or more locations;
instructions that cause the processor to receive a selection directed at a particular item from the one or more items in the playlist, the particular item corresponding to a particular location in the one or more locations; and
instructions that cause the processor to provide a particular extracted portion of the audio book data corresponding to the particular location.

* * * * *